Oct. 11, 1932.   W. E. GULDAGER   1,881,523
ADJUSTABLE BORING TOOL
Filed Dec. 26, 1928   2 Sheets-Sheet 1
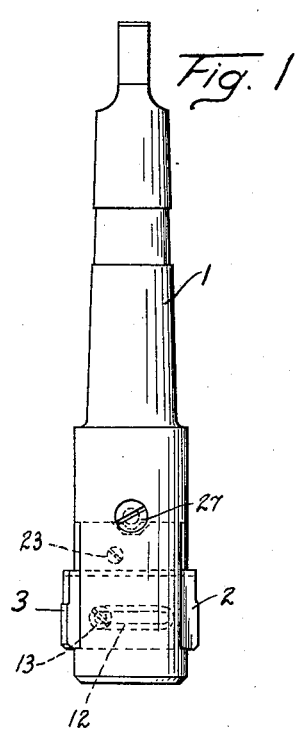
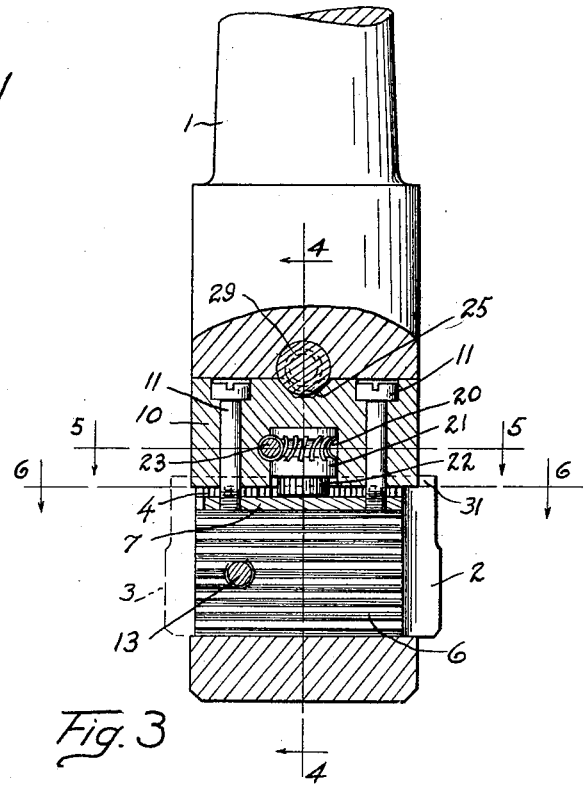
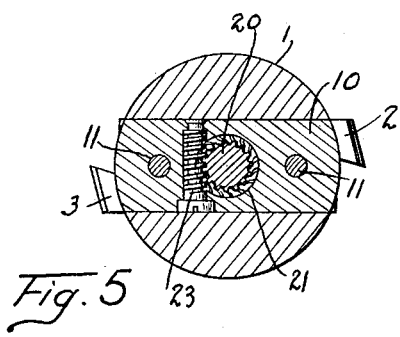
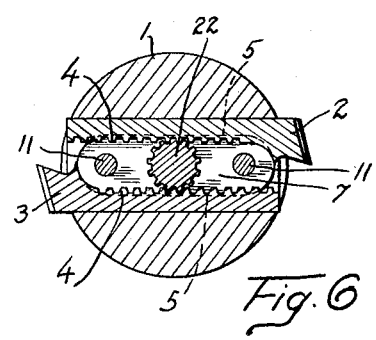
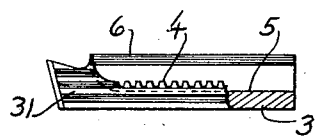
INVENTOR.
Walter E. Guldager
BY
Stuart C. Barnes
ATTORNEY.

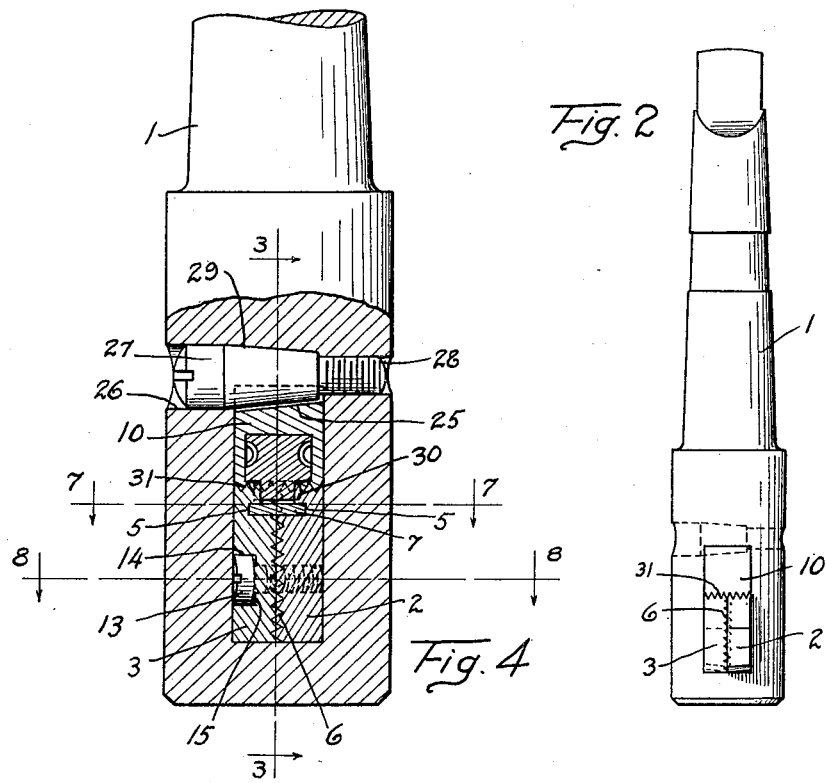
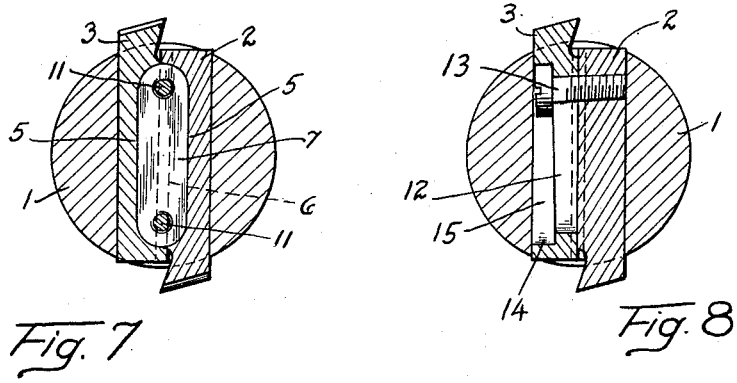

Patented Oct. 11, 1932

1,881,523

UNITED STATES PATENT OFFICE

WALTER E. GULDAGER, OF DETROIT, MICHIGAN, ASSIGNOR OF ONE-HALF TO LAWRENCE C. OAK, OF DETROIT, MICHIGAN

ADJUSTABLE BORING TOOL

Application filed December 26, 1928. Serial No. 328,364.

This invention relates to an adjustable boring tool, and the object of the invention is to provide such a tool which can be quickly and easily adjusted to the desired size.

It is appreciated that tools of this nature have been heretofore proposed, but such tools, while embodying an adjustment, have required considerable time in making the same. Moreover, tools heretofore proposed have had the cutting knives arranged so that adjustments could only be effected by moving the knives a predetermined set distance. This necessitated an unnecessary amount of grinding of the cutting edges to bring the cutting tools to the precise size. In accordance with the present invention, however, a flexible adjustment is provided so that any amount of adjustment can be effected and the position of the cutting edges of the tool can be determined by suitable calipers or the like, and no unnecessary grinding of the cutting edges is necessary.

In the drawings:

Fig. 1 is a side elevational view of a tool constructed in accordance with the invention.

Fig. 2 is a view thereof taken at right angles to Fig. 1.

Fig. 3 is a sectional view taken on line 3—3 of Fig. 4 illustrating the adjustable mechanism.

Fig. 4 is a section taken at right angles to Fig. 3 and on line 4—4 of that figure.

Fig. 5 is a section taken on line 5—5 of Fig. 3 illustrating the mechanism which is employed in making an adjustment.

Fig. 6 is a sectional view taken on line 6—6 of Fig. 3 illustrating further mechanism employed.

Fig. 7 is a section taken on line 7—7 of Fig. 4 in illustration of the knife construction and holding means therefor.

Fig. 8 is a sectional view taken on line 8—8 of Fig. 4 in illustration of a construction which affords a positive set for the cutting tools when once adjusted.

Fig. 9 is a side elevational view of one of the cutting knives.

The tool consists of a suitable bar 1 which is to be held in any suitable rotating device, and this bar carries cutting knives 2 and 3.

Each cutting tool, as shown in Fig. 6, is provided with a rack construction 4 and back of this rack construction each tool is milled out to form a groove 5, as perhaps best shown in Fig. 9.

Complemental cutting tools of this nature are placed together with their cutting edges opposed after the manner shown in Figs. 6, 7, and 8, and the abutting faces of the members are preferably complementally serrated, as shown at 6 (Fig. 4), which serrations interfit with each other. These serrations run in the direction of adjustment so that as the knives are moved relative to each other they slide on these serrated faces. When the knives are thus placed together, the milled out portions 5 of the two knives cooperate to form an undercut channel within which is placed a suitable plate 7 (Fig. 4). This plate 7 lies immediately beyond the opposed gear racks 4.

For the purpose of uniting these two cutting tools into a single unit, a centering block 10 is provided which has suitable apertures therethrough for receiving machine screws 11. These machine screws are threaded into threaded apertures in the plate 7 and they project through the space between the opposed racks (Fig. 6).

Thus it will be seen that in making up the original assembly, two cutting tools are placed in proper complemental relation so that they form an undercut guideway and in which is disposed a plate for receiving screws which secure the tools, through the means of the plate, to a centering block. At this point it is advantageous to point out how the two tools are held together. One tool, as shown in Fig. 8, has an elongated opening 12 for the passage therethrough of a screw 13 while the other plate has a screw threaded aperture for receiving such screw. Tightening of this screw holds the two cutting tools together. The head of the screw 13 seats in a countersunk portion 14 and the shoulders 15 of this countersunk portion are at an angle to the sides of the tool. Also the screw is disposed at a similar angle, so that the head of the screw seats flatly upon the shoulders. This angularity is arranged so that when the cutting edges of the two tools are urged toward each other by a more or less compressing force on the tool as a whole in its operation, the tendency is for an increased tightness to occur so that it is impossible to cause slippage of these tools in service. This will be brought out clearly in relation to the adjusting mechanism now to be described.

The centering block 10 is recessed as at 20 and fitted in this recess is a worm gear member 21. It is disposed in the recess so as to rotate therein and has a projecting gear part 22 which projects beyond the end of the centering block and in between the opposed racks of the cutting tools and in mesh with these racks as shown in Fig. 6. For making an adjustment there is a screw member or worm 23 mounted in the body of a block in a suitable aperture therein and which meshes with the wormed gear 21 (Fig. 5). No other holding means for the worm gear member is necessary inasmuch as it cannot fall out of its socket so long as it is engaged by the worm member 23.

With the parts thus described in assembly and properly adjusted, they are placed as a body into the shank 1 which is provided with a suitable aperture therefor. The centering block has a cut away portion 25, the bottom of which is disposed at an angle as shown in Fig. 4, and the sides of which are angularly disposed as shown in Fig. 3. The body of the tool, or the shank, has an aperture 26 for the reception of a centering screw 27 which is screw threaded into an aperture 28. This centering screw has a wedge shaped center part 29 which engages in the cut away portion 25 and due to this construction the cutting block, which in assembly embodied the centering block, the two cutting tools, and other associated parts, is centered as the screw 27 is screwed home. Moreover, the block is held tightly in its recess because it is urged downwardly with a cam action against the bottom of the opening in the tool.

It is preferable to serrate one edge of the centering block as at 30 and also to serrate the abutting faces of the cutting tools as at 31. These serrations run in a direction the same as the serrations 6 between the cutting blocks.

An adjustment of this tool is made as follows: first, it is necessary to remove the cutting unit from the shank and this is accomplished by taking out the screw 27. The next thing to be done is to loosen screw 13 to relieve the clamping action between the two cutting tools and to also loosen slightly the screws 11. It makes no difference which one of these screws is first loosened. It now remains only to make the actual adjustment which is accomplished by turning the screw member 23. Preferably the head of this screw is shaped to take a suitable tool such as a screw driver.

Rotation of the screw member 23 rotates the worm gear member 21 whereupon its geared portion 22 which is in mesh with the racks upon the tools urges the cutting tools in or out depending upon the direction of rotation. This is accomplished, of course, when the clamping screws between the cutting tools, and between the cutting tools and centering head, are loose so that there is no particular strain upon these small mechanical parts. A suitable gauge may now be used for the purpose of determining when the correct adjustment has been obtained, and when this is done the screws 11 and 13 are again tightened. It now remains only to reinsert this assembled block back into the shank, insert the screw 27 and screw it home, thus centering the assembled block and holding it tightly in the shank.

In use, the pressure on the cutting tools is in the nature of a compression which urges the cutting tools together. Accordingly, any such tendency is resisted by the wedge action which is effected due to the angular position of the clamping screw 13 and the shoulder 15 against which the head of the screw cuts. This effectively takes all operative strains so that the relatively small adjusting mechanism is completely protected and is not required to overcome any working strains.

It will be noted that, by this invention, the cutting tools can be adjusted just to the desired point, and then set in this position. This is very advantageous because it requires no grinding of the cutting edges to complete or effect the adjustment. In order to make this more clear, an example of a proposed tool may be discussed; this proposed tool provided the two cutting knives with serrations running at right angles to the direction of adjustment, and the smallest possible adjustment is to move the knives over a distance of one serration. This may be about $\frac{1}{32}$ of an inch which is to be split 1/64 for each knife. Oftimes, such a large adjustment is not desirable, but as there is no alternative; so to complete the job the cutting edges have to be ground down although they may be perfectly sharp and need no grinding. This, of course, wears the cutting tools out all too rapidly. The present invention overcomes all this because precise adjustment can be effected with little or no trouble.

I claim:

1. In an adjustable boring tool, a pair of complemental cutting devices, a gear rack on each device which are disposed in opposed relation, a channel in each cutting device back of the gear rack, a plate in the channel, a holding block, one or more screws in the holding block associated with the plate for holding the cutting devices and block together, a worm gear member embedded rotatively in the block having a gear portion which protrudes therefrom and engages with the racks of the cutting devices, and a screw member rotatively embedded in the block which meshes with a worm gear member and which is operable to effect rotation of the gear member to effect adjustment of the cutting devices.

2. In an adjustable boring tool, a pair of complemental cutting devices, a gear rack on each device which are disposed in opposed relation, a channel in each cutting device back of the gear rack, a plate in the channel, a holding block, one or more screws in the holding block associated with the plate for holding the cutting devices and block together, a worm gear member embedded rotatively in the block having a gear portion which protrudes therefrom and engages with the racks of the cutting devices, a screw member rotatively embedded in the block which meshes with a worm gear member and which is operable to effect rotation of the gear member to effect adjustment of the cutting devices, and means for clamping the cutting devices together to maintain adjusted position independently of the enumerated adjusting mechanism.

3. In an adjustable boring tool, a pair of complemental cutting devices, a gear rack on each device which are disposed in opposed relation, a channel in such cutting device back of the gear rack, a plate in the channel, a holding block, one or more screws in the holding block associated with the plate for holding the cutting devices and block together, a worm gear member embedded rotatively in the block having a gear portion which protrudes therefrom and engages with the racks of the cutting devices, a screw member rotatively embedded in the block which meshes with the worm gear member and which is operable to effect rotation of the gear member to effect adjustment of the cutting devices, and means embodying an inclined plane for clamping the adjusting devices together whereby to maintain them in adjusted position independently of the enumerated adjusting mechanism.

4. In an adjustable boring tool, a shank having an aperture therein with parallel side walls, a pair of complemental cutting instruments located in the aperture having sides engaging the sides of the aperture and having engaging faces parallel to their said sides and parallel to the aperture walls, means for slidably adjusting the instruments relative to each other, the engaging faces of the instruments each having a multiplicity of parallel serrations therein with the serrations of the faces interfitting and all extending in a direction parallel to the direction of movement of adjustment, and means connecting the instruments for clamping them to each other embodying a surface inclined relative to the said engaging surfaces and aperture walls and arranged to effect a wedge action against displacement of the instruments relative to each other by compression action incident to cutting, said interconnecting means comprising a screw threaded into one instrument at an angle to the perpendicular of the engaging faces, the other cutting instrument having an elongated slot for accommodating said screw, a counterbore for the head of the screw and an inclined shoulder around the slot positioned perpendicular to the position of the screw.

In testimony whereof I affix my signature.

WALTER E. GULDAGER.